United States Patent
Brunner et al.

(10) Patent No.: US 7,728,834 B2
(45) Date of Patent: Jun. 1, 2010

(54) METHOD AND APPARATUS FOR RECONSTRUCTING A THREE-DIMENSIONAL IMAGE VOLUME FROM TWO-DIMENSIONAL PROJECTION IMAGES

(75) Inventors: Thomas Brunner, Nürnberg (DE); Frank Deinzer, Röthenbach (DE); Jürgen Franke, Erlangen (DE); Benno Heigl, Coburg (DE); Alois Nöttling, Pottenstein (DE)

(73) Assignee: Siemens Aktiengesellschaft-Muenchen (DE)

( * ) Notice: Subject to any disclaimer, the term of this patent is extended or adjusted under 35 U.S.C. 154(b) by 838 days.

(21) Appl. No.: 11/523,394

(22) Filed: Sep. 19, 2006

(65) Prior Publication Data
US 2007/0064001 A1    Mar. 22, 2007

(30) Foreign Application Priority Data
Sep. 19, 2005    (DE) .................. 10 2005 044 653

(51) Int. Cl.
   G06T 17/00    (2006.01)
   A61B 6/00    (2006.01)

(52) U.S. Cl. .......................................... 345/424; 378/4

(58) Field of Classification Search .................. None
See application file for complete search history.

(56) References Cited

U.S. PATENT DOCUMENTS

| | | | | |
|---|---|---|---|---|
| 4,812,983 | A | * | 3/1989 | Gullberg et al. ................ 378/14 |
| 5,881,122 | A | * | 3/1999 | Crawford et al. ............... 378/4 |
| 6,008,813 | A | * | 12/1999 | Lauer et al. .................. 345/424 |
| 6,236,704 | B1 | | 5/2001 | Navab et al. |
| 6,795,522 | B2 | * | 9/2004 | Nishide et al. ................ 378/4 |
| 2003/0052879 | A1 | * | 3/2003 | Barth et al. .................. 345/424 |
| 2004/0179643 | A1 | | 9/2004 | Gregerson et al. |

FOREIGN PATENT DOCUMENTS

DE    100 30 633 A1    1/2001

OTHER PUBLICATIONS

Ramesh R. Galigekere, Karl Wiesent, David W. Holdsworth, "Cone-beam Reprojection Using Projection-Matrices," Oct. 2003, IEEE Transactions on Medical Imaging, vol. 22, No. 10, pp. 1202-1214.*
K. Wiesent, K. Barth, M. Navab, P. Durlak, T. Brunner, O. Schutz and W. Seissl, "Enhanced 3-D-Reconstruction Algorithm for C-Arm Systems Suitable for Interventional Procedures," 2000, IEEE Transactions on Medical Imaging, vol. 19, No. 5.*
Karl Wiesent, K. Barth, N. Navab, P. Durlak, T. Brunner, O. Schuetz and W. Seissler; "Enhanced 3-D-Reconstruction Algorithm for C-Arm Systems Suitable for Interventional Procedures"; IEEE Transactions on Medical Imaging; May 2000; pp. 391-403; vol. 19, No. 5.
L. A. Feldkamp, L.C. Davis, and J. W. Kress; "Practical cone-beam algorithm"; Optical Society of America; Jun. 1984; pp. 612-619; vol. 1, No. 6.

* cited by examiner

Primary Examiner—Jason M Repko

(57) ABSTRACT

The invention relates to a method and an apparatus for reconstructing a three-dimensional image volume from two-dimensional projection images of a subject which have been taken from different projection directions by rotating the recording system around the subject, wherein the grayscale values of the voxels of the image volume are calculated by back projection of the projection images. The invention is characterized in that prior to back projection at least one projection image is modified in such a way that it corresponds to a projection image taken with a virtual detector whose axes are aligned parallel to the rotational axis of the recording system.

11 Claims, 2 Drawing Sheets

METHOD AND APPARATUS FOR RECONSTRUCTING A THREE-DIMENSIONAL IMAGE VOLUME FROM TWO-DIMENSIONAL PROJECTION IMAGES

CROSS REFERENCE TO RELATED APPLICATIONS

This application claims priority of German application No. 10 2005 044 653.1 filed Sep. 19, 2005, which is incorporated by reference herein in its entirety.

FIELD OF THE INVENTION

The invention relates to a method and an apparatus for reconstructing a three-dimensional image volume from two-dimensional projection images, as well as a computer program product and a digital storage medium with a program code for carrying out the method. In particular the invention pertains to a method or an apparatus in which the projection images are recorded from different projection directions by rotating a recording system around a subject, the voxels of the image volume being calculated by back projection of the projection images.

BACKGROUND OF THE INVENTION

In radiology the need often exists to reconstruct a three-dimensional (3D) image from two-dimensional (2D) images for diagnosis, therapy planning and during interventional procedures. The problem arises with so-called C-arm x-ray systems, for example, in which the x-ray tube and detector are mounted on a C-arm which is freely maneuverable around the patient. It is often desirable to reconstruct a three-dimensional image volume from two-dimensional x-ray images or projection images thus obtained. However, in this case the projection geometry is more complex than with a computer tomograph, as the latter x-rays the subject under examination section by section with a fan beam, whereas the beam is cone-shaped in the case of a c-arm machine. This statement is not true of multislice CT. For example, for 64-row scanners an algorithm for cone-beam projection geometry is also required. Moreover, C-arm systems are often mechanically unstable and do not move exactly on a circular orbit around the subject, but produce e.g. slight vibrations.

For reconstructing structures with low x-ray contrast (e.g. soft parts in medical data) a large number of projection images are required, which greatly increases the computational cost/complexity and may therefore negatively impact the usability of the system. For example, during an interventional catheter treatment, the reconstruction must if possible be complete within a few seconds or a few minutes at the most.

A method for such a reconstruction is disclosed in the article "Practical cone-beam algorithm" by L. A. Feldkamp, L. C. Davis and J. W. Kress, Journal of the Optical Society of America 1, 612-619 (1984). An implementation and adaptation of this system for use in C-arm systems is described in "Enhanced 3-D-reconstruction algorithm for C-arm systems suitable for interventional procedures" by K. Wiesent, K. Barth, M. Navab, P. Durlak, T. Brunner, O. Schütz and W. Seissl, IEEE Transactions on Medical Imaging, Vol. 19, No. 5 (2000). This method is based on back projection, i.e. the grayscale values of the projection images are summed for each voxel in the image volume at the corresponding image points. For each projection image, the image volume to be reconstructed is run through voxel by voxel, the projection of the voxel is computed and the grayscale value of the corresponding pixel of the projection image is added to the voxel value.

This method requires that the projection geometry of the recording system has been separately determined in advance for each recording position by means of a calibrating method, allowing for any deformations and dynamic movements of the recording system, which means that in general the main axes of the volume to be reconstructed do not have a uniform orientation in the projection images. In general it must therefore be assumed for each projection that the spacings of adjacent voxels in the projection are not uniform in any direction.

For the general projection geometry occurring in C-arm systems, at least three additions and two divisions must be carried out for each voxel, see e.g. page 395 of the abovementioned article by K. Wiesent et al. in IEEE Transactions on Medical Imaging. In the algorithm specified there, the voxels of the image volume are sampled in three nested loops in the x-, y- and z-direction. In the innermost loop, the relevant z-coordinate is then multiplied by the projection matrix and the homogeneous pixel coordinates (r, s, t) thereby obtained are normalized so that the position of the corresponding pixel in the image coordinates is finally yielded as u=r/t and v=s/t. Finally the pixel closest to the position (u, v) must be determined and accumulated to the grayscale value of the voxel at the position (x, y, z). As these operations must be performed in the innermost loop, this results in considerable computational cost/complexity. In addition, random memory access to the projection data is required which negatively impacts the necessary memory transfer between main memory and cache.

Pared down to its essential algorithmic processing steps, the known back-projection algorithm can be described as follows:

---

For each slice of the 3D volume (with uniform z-value)
    Determine the projection of the vertex of the slice
    For each row of the slice (with uniform y-value)
        Determine the projection of the row start point as a function of the slice vertex
        For each voxel of the row (x-direction)
            Determine the projection of the voxel as function of the start point of the row (3 additions and 2 divisions)
            Accumulate the grayscale value of the image point to the voxel value (1 addition)
        End
    End
End.

---

SUMMARY OF THE INVENTION

The object of the invention is to provide a rapid reconstruction method and corresponding apparatus which can be used even with mechanically unstable recording systems.

This object is achieved by the invention as claimed in the independent claims. Advantageous embodiments of the invention are set forth in the sub-claims.

The problem is solved by modifying at least one projection image prior to back projection in such a way that it corresponds to a projection image taken by a detector whose vertical columns are aligned parallel to the axis of rotation of the recording system. The advantage of this modification of one or more projection images is that the projection geometry is simplified such that the projections of all the voxels lying on a straight line parallel to the rotational axis of the recording system are equidistant. If these voxels are sampled consecutively, the pixel corresponding to them on the modified projection image can be determined from the previous point by simple addition of the spacing, thereby considerably reducing the computational cost/complexity.

Because of the lower nesting depth of the program loops required for that purpose, the additional arithmetic operations required for modifying the projection images are irrelevant compared to the savings within the back projection.

Also with the method according to the invention, the actual projection geometries of the recording system are advantageously determined in advance for each recording position by means of a calibrating process. It has already been possible to confirm the reproducibility of these projection geometries for a number of equipments.

The modified projection image is preferably obtained from the original projection image by application of a projective transformation (=homography). Such transformations with which the points of a plane are mapped to another plane are known in the prior art and are used e.g. for correcting the screen projections for projectors. Such a transformation corresponds to the image changes occurring if the screen is inclined.

The projection matrix associated with the relevant projection image is preferably modified likewise by multiplication by a homography.

According to a preferred embodiment, the area of the virtual detector can cover either the entire projection region of the recording system or only the maximum reconstructable volume. The maximum reconstructable volume is generally taken to mean the volume which is covered by all the projection images. By matching the modified projection image to this volume, reconstruction can therefore be more efficiently organized.

Advantageously, the z-direction of the subject's coordinate system runs parallel to the rotational axis of the recording system. In this case the z-direction for the back position is preferably sampled in the innermost loop and the vertical image coordinates of the projection image are computed by the addition of an increment that is constant for the x-and y-coordinates of this loop. This uses the property of the modified projection geometry that the projections of the voxels along the z-direction are equidistant in the modified projection image and can therefore be determined from the previous point by simple addition of the spacing.

For the accumulation of the grayscale value of the image point of a projection image to the grayscale value of the voxel, the most adjacent pixel ("nearest neighbor") of the projection image is preferably used. Alternatively the grayscale value can also be computed by interpolation from a plurality of nearest neighbors. However, the advantage of using the nearest neighbor is that, by means of this method, the memory accesses to the projection image can be optimally adapted for caching within the computing unit. Whereas in the prior art random access to a plurality of rows of the projection image had to be enabled within the inner loop, with the invention this can be limited to one image row. During back-projection the modified projection image is therefore preferably stored in a data memory which is organized in such a way that vertically adjacent pixels follow one another. If the linear storage of the projection image is oriented in this way, access in the innermost loop to an image row or column, and therefore to a very restricted memory area, is limited and optimized for caching.

Instead, if the linear storage of the projection image is organized on a row-by-row basis, the virtual detector can also be rotated through 90° by appropriate modification of the homography.

If, as described in the abovementioned article by L. A. Feldkamp, weighting of the distance between voxel and projection center is to take place orthogonally to the detector within the back-projection, in contrast to the prior art, the weighting factor required for this purpose can be computed outside the inner loop, which also considerably reduces the number of necessary operations for this enhanced algorithm.

BRIEF DESCRIPTION OF THE DRAWINGS

The invention will now be explained in greater detail with reference to the accompanying drawings in which.

DETAILED DESCRIPTION OF THE INVENTION

Figure 1:
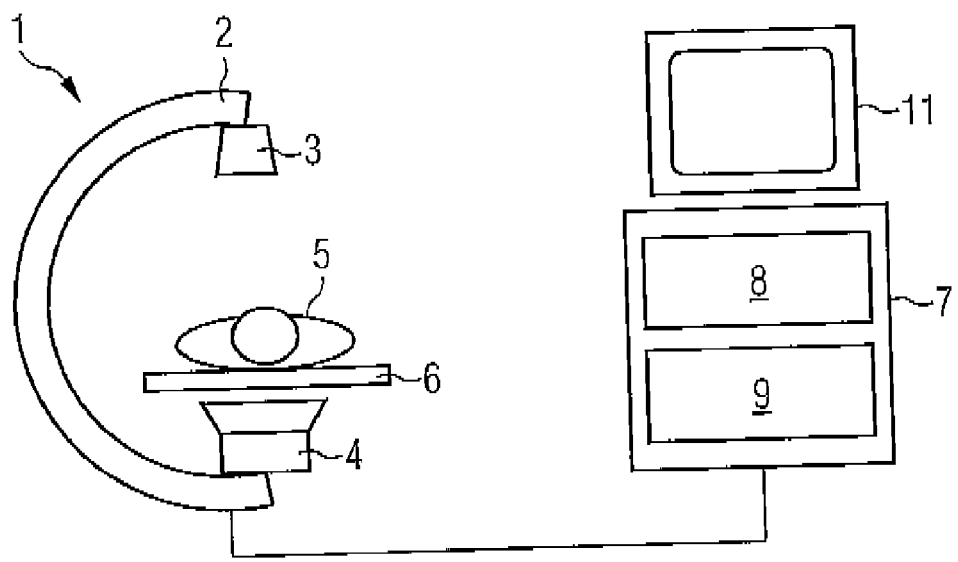
FIG. 1 schematically illustrates a C-arm system with which the invention can be implemented.

FIG. 1 schematically illustrates a C-arm x-ray system 1 having a C-arm 2 on which an x-ray tube 3 and an x-ray detector 4 are mounted opposite one another. The angular position of the C-arm can be rotated (angled) around a table 6 with a patient 5 supported thereon in order to obtain x-ray images from different projection directions. The resulting 2D images are forwarded to a control and computing unit 7 comprising at least a data memory 8 and a computing module 9 incorporating a processor or the like. The recorded projection images and the if necessary reconstructed image volumes can be viewed on a monitor 11.

Figure 2:
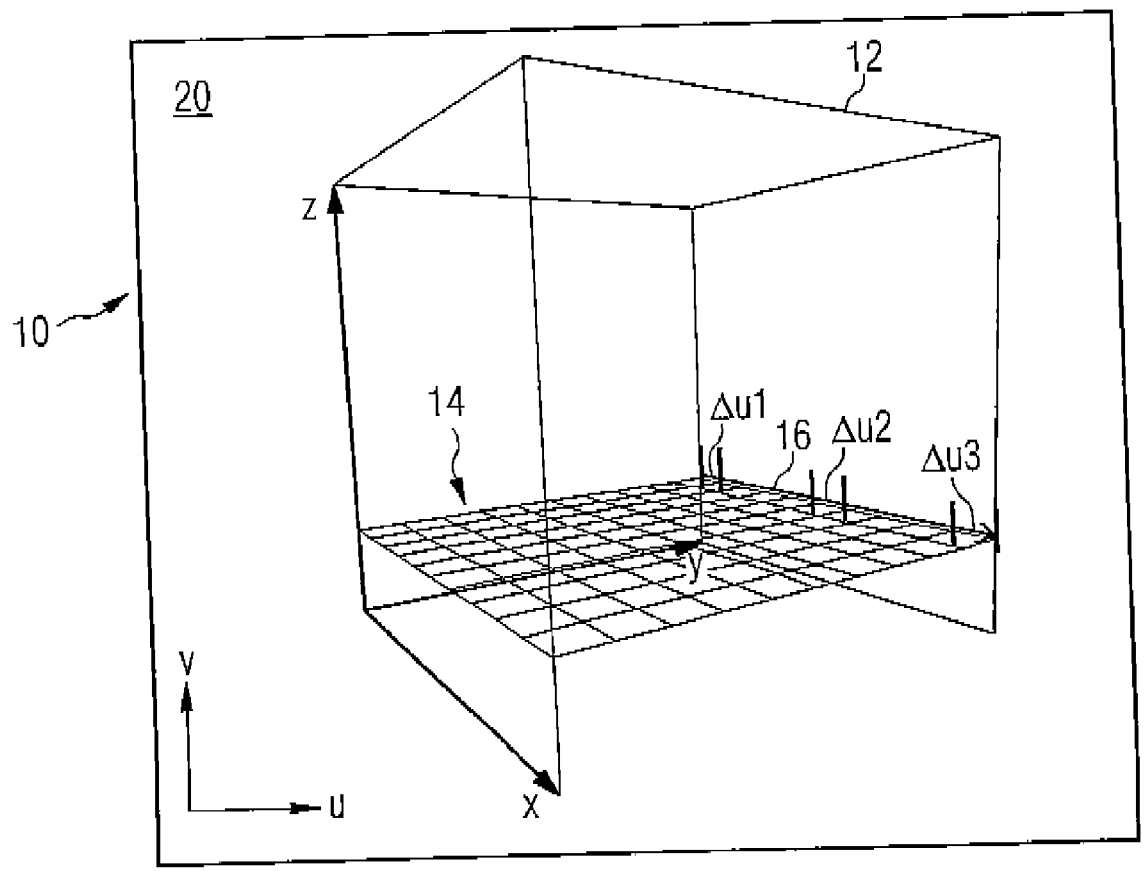
FIG. 2 shows the projection geometry according to the prior art.

FIG. 2 shows the projection geometry for such a C-arm system prior to modification of the projection image. The figure shows the detector plane 10 with, projected thereon, a representation of the volume 12 to be reconstructed which constitutes the image volume to be reconstructed. The figure therefore shows the positions of the voxels in the image dataset 12, projected onto the detector plane 10, and corresponds to the actually measured projection image 20.

The main axes of the image volume to be reconstructed are denoted by x, y and z, whereas the main axes of the projection image are marked u and v. Since the detector, as is frequently the case with a C-arm system, is not aligned exactly to the rotational axis, the z-axis in the image volume is not parallel to the edge of the detector and therefore to the vertical image direction v.

For the back position, the image dataset 12 is run through voxel by voxel and the image coordinates u, v of the projection are computed in each case, the current reconstruction slice being labeled 14. If, for example, the x-direction is sampled along the arrow marked 16 in the innermost loop, it becomes apparent that adjacent voxels are not projected equidistantly, but with different spacings $\Delta u1$, $\Delta u2$ and $\Delta u3$. In other words the projection of each voxel must be re-computed from its three coordinates x, y and z and cannot be derived e.g. by addition of a constant spacing $\Delta u$ or $\Delta v$ from the projection of an adjacent point.

Figure 3:
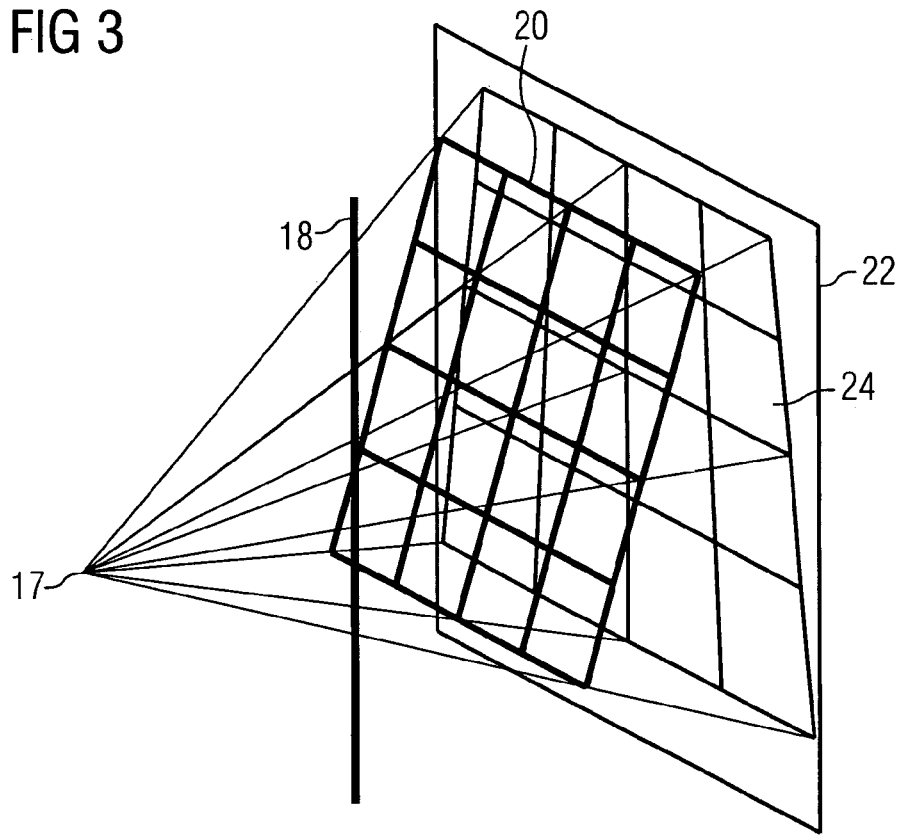
FIG. 3 schematically illustrates a modification of a projection image.

FIG. 3 shows an example of the step in which a projection image 20 is modified in such a way that it corresponds to a projection image 24 taken by a virtual detector 22 whose columns are aligned parallel to the rotational axis 18 of the recording system. The x-ray focal point is shown at 17. The subject (not shown) that is projected onto the actual detector plane 20 is in the cone of the beam. To make the projective transformation clear, the projection image 20 is shown as a grid. When this projection image is modified, an image shall be generated which corresponds as precisely as possible to the image which would have been taken by a virtual detector 22 oriented parallel to the rotational axis 18. The corresponding image homography can be determined from the known parameters of the projection geometry. In the example shown, the slightly distorted grid 24 would be produced by the transformation.

Figure 4:
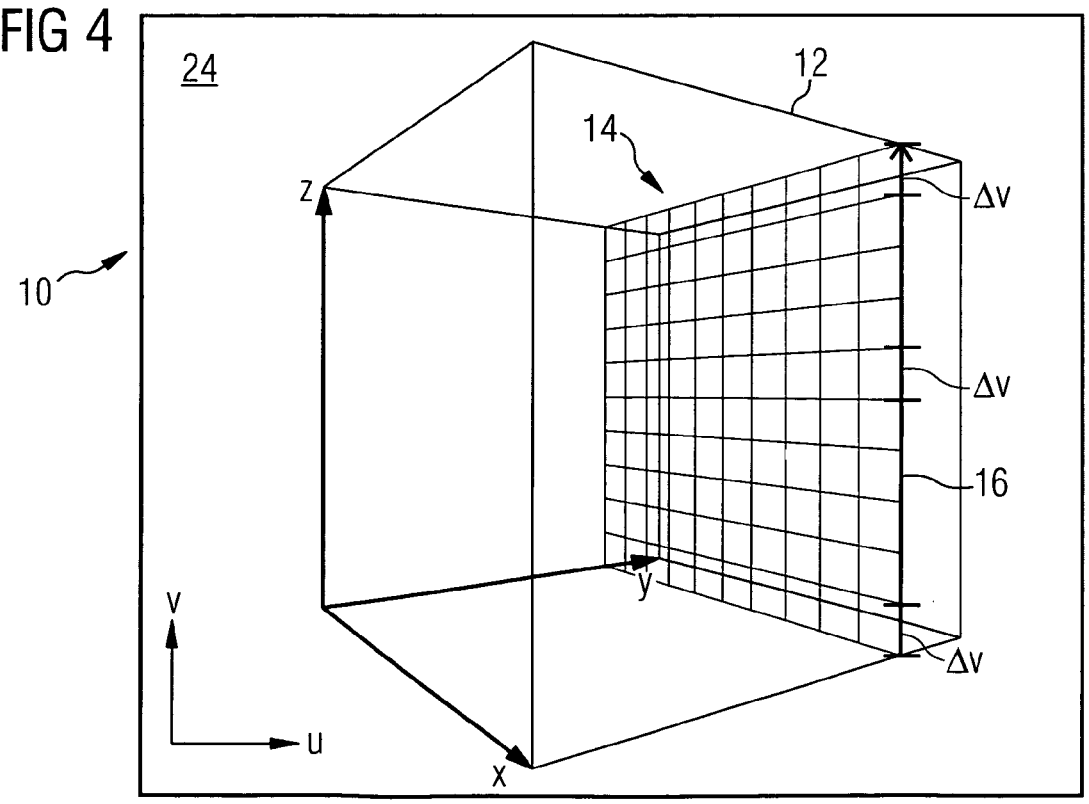
FIG. 4 schematically illustrates the projection geometry after the modification.

FIG. 4 shows the projection geometry for a projection image 24 modified in this way. It again shows the detector plane 10, which in this case is the detector plane of the virtual detector 22. By means of the modification as shown in FIG. 3, the z-axis of the image volume to be reconstructed is now parallel to the vertical main axis v of the projection image. Because of this parallelism, the spacings of the projections of adjacent voxels are equidistant on a straight line 16 placed in the z-direction. For the straight line 16 the spacing are e.g. $\Delta v$.

This equal spacing effect can be made clear using the intercept theorem which states if two rays originating from a point are intersected by two parallel lines, the segments on the parallel lines behave like the corresponding segments, measured from the beam focal point, on each beam. With reference to FIG. 4, the columns of the image volume 12 are therefore parallel lines which are intersected by x-rays originating from the x-ray focal point. Provided the columns of the image volume are therefore aligned parallel to the detector plane, the projections of the voxels are equidistant.

Advantageously the image volume as shown in FIG. 4 is sampled differently from in FIG. 2, i.e. with the z-direction in the innermost loop. Pared down to the essential algorithmic processing steps, the back projection can be represented as follows:

```
For each slice of the 3D volume (now with uniform y-value)
Determine the projection of the slice vertex
    For each row of the slice (now with uniform x-value)
    Determine the projection of the row start point as a function
    of the slice vertex
        Determine the increment in the projection image
        For each voxel of the row (z-direction)
        Determine the projection of the voxel as function of the start
        point of the row (1 addition)
        Accumulate the grayscale value of the image point to the
        voxel value (1 addition)
        End
    End
End.
```

The sequence of the outer and middle computing loop can also be transposed. By this means, in the inner loop the number of necessary additions is reduced by 50% and the divisions eliminated altogether, thereby considerably reducing computational cost/complexity.

The advantage of the faster back projection achieved by the invention in clinical practice is that when using the method during an interventional procedure the waiting time between acquisition of the projection data and the availability of the reconstructed volume is significantly reduced. This is particularly important when low contrasts within the recorded subject necessitate reconstruction from several hundred projection images. A clinical example in which both rapid diagnosis and the visibility of small contrasts and therefore the processing of a large number of projection images is relevant is the case of bleeding inside the brain which can occur during an interventional treatment.

By speeding up back projection, further algorithmic enhancements of reconstruction quality, requiring e.g. the multiple use of back projection with intervening correction to the projection data, become feasible.

The invention claimed is:

1. A method for reconstructing a three-dimensional image volume from a plurality of two-dimensional projection images of a subject, comprising:
   recording the plurality of two-dimensional projection images from a plurality of different projection directions by rotating a recording system having a real detector about a rotational axis and around the subject;
   modifying at least one of the projection images to provide a modified projection image which corresponds to a projection image recorded with a virtual detector having an axis aligned parallel to the rotational axis of the recording system so that projections of all voxels in a row and lying on a straight line parallel to the rotational axis are spaced apart an equal voxel spacing distance, this enabling, during consecutive sampling of voxels along the straight line, a determination of consecutive voxel locations by addition of the spacing distance; and
   calculating grayscale values of voxels of the three-dimensional image volume by back projection of the projection images including the modified projection image wherein, for voxels in the modified projection image (i) projection of each voxel positioned along the straight line is determined relative to a start point along the voxel row with only one addition and with no divisions, and (ii) a grayscale value of a pixel corresponding to one of the voxels in the modified projection image is accumulated to a gray scale value of the voxel with an addition.

2. The method as claimed in claim 1, wherein the modified projection image is a projective transformation from the projection image taken with the real detector.

3. The method as claimed in claim 1, wherein the virtual detector covers either an entire projection region of the recording system or only a maximum reconstructable volume of the projection images.

4. The method as claimed in claim 1, wherein the voxels of the three-dimensional image volume are sampled in three loops in x-, y-and z-direction.

5. The method as claimed in claim 4, wherein a nearest voxel of the modified projection image is used for accumulating the grayscale value of the modified projection image.

6. The method as claimed in claim 4, wherein for a voxel in the modified projection image grayscale value is multiplied by a weighting factor depending on a distance between the voxel and projection center orthogonally to the virtual detector prior to accumulation of the grayscale value of the voxel.

7. The method as claimed in claim 6, wherein the weighting factor is not computed in the innermost loop.

8. The method as claimed in claim 1, wherein the modified projection image is stored in a data memory during the back projection which is organized by placing adjacent voxels in the row lying on the straight line next to each other.

9. The method as claimed in claim 1, wherein the subject is a live patient.

10. An apparatus for reconstructing a three-dimensional image volume from a plurality of two-dimensional projection images of a patient, comprising:
    a recording system with a real detector rotatable about a rotational axis and about the patient which records the projection images from a plurality of different directions; and a computing module which:
(a) modifies at least one of the projection images to provide a modified projection image which corresponds to a projection image recorded with a virtual detector having an axis aligned parallel to the rotational axis of the recording system so that projections of all voxels in a row and lying on a straight line parallel to the rotational axis are spaced apart an equal voxel spacing distance, this enabling, during consecutive sampling of voxels along the straight line, a determination of consecutive voxel locations by addition of the spacing distance; and
(b) calculates grayscale values of voxels of the three-dimensional image volume by back projection of the projection images including the modified projection image wherein, for voxels in the modified projection image (i) projection of each voxel positioned along the straight line is determined relative to a start point along the voxel row with only one addition and with no divisions, and (ii) a grayscale value of a pixel corresponding to one of the voxels in the modified projection image is accumulated to a gray scale value of the voxel with an addition.

11. The apparatus as claimed in claim 10, wherein the modified projection image is a projective transformation from the projection image taken with the real detector.

* * * * *